(12) United States Patent
Haddad

(10) Patent No.: US 8,699,433 B2
(45) Date of Patent: Apr. 15, 2014

(54) SYSTEM AND METHOD FOR PROVIDING MOBILITY WITH A SPLIT HOME AGENT ARCHITECTURE

(75) Inventor: Wassim Haddad, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 688 days.

(21) Appl. No.: 12/969,235

(22) Filed: Dec. 15, 2010

(65) Prior Publication Data

US 2012/0023211 A1    Jan. 26, 2012

Related U.S. Application Data

(60) Provisional application No. 61/366,314, filed on Jul. 21, 2010.

(51) Int. Cl.
| | |
|---|---|
| *H04W 28/10* | (2009.01) |
| *H04W 40/12* | (2009.01) |
| *H04W 40/20* | (2009.01) |
| *H04W 40/38* | (2009.01) |
| *H04W 36/00* | (2009.01) |

(52) U.S. Cl.
USPC ..... 370/329; 455/432.1; 455/445; 455/452.2; 709/228; 709/239; 726/3; 380/44; 380/270

(58) Field of Classification Search
USPC .......... 370/237, 328, 329, 331, 332; 455/440, 455/452.2, 432.1, 435.1, 436, 443, 452.1; 709/223, 228, 239; 726/3; 380/44, 247, 380/270

See application file for complete search history.

(56) References Cited

U.S. PATENT DOCUMENTS

| | | | |
|---|---|---|---|
| 6,549,522 | B1 * | 4/2003 | Flynn ............................ 370/313 |
| 6,973,057 | B1 | 12/2005 | Forsloew |
| 7,519,738 | B2 | 4/2009 | Forsberg |

(Continued)

FOREIGN PATENT DOCUMENTS

EP        2129056        12/2009

OTHER PUBLICATIONS

3GPP: "3rd Generation Partnership Project; Technical Specification Group Services and System Aspects; 3GPP system to Wireless Local Area Network . . ." vol. SA WG2; Nov. 19, 2002; 11 pages.

(Continued)

*Primary Examiner* — Ahmed Elallam
(74) *Attorney, Agent, or Firm* — Blakely, Sokoloff, Taylor & Zafman

(57) ABSTRACT

A method implemented by a network element functioning as a home agent (HA) for a mobile node (MN) communicating with a corresponding node (CN) using Mobile Internet Protocol version 6 (MIPv6), the method including selecting by the HA a virtual home agent (VHA) in the network to provide home agent services to the MN with a better quality of service than the HA, sending a flow switch request (FSR) message to the selected VHA, the FSR message including a home keygen token, an address of the CN and a care-of address of the MN, the FSR message to cause the selected VHA to direct the CN to send data traffic for the MN to the selected VHA instead of the HA, and receiving a flow switch acknowledgement (FSA) message from the VHA indicating that the selected VHA has successfully redirected the data traffic from the CN to the MN.

13 Claims, 6 Drawing Sheets

(56) References Cited

U.S. PATENT DOCUMENTS

| | | | |
|---|---|---|---|
| 7,840,217 B2* | 11/2010 | Patel et al. | 455/439 |
| 8,040,845 B2* | 10/2011 | Oulai et al. | 370/329 |
| 8,077,695 B2 | 12/2011 | O'Neill | |
| 8,125,954 B2 | 2/2012 | Wu | |
| 8,165,290 B2* | 4/2012 | Gundavelli et al. | 380/44 |
| 8,230,076 B2 | 7/2012 | Wenige et al. | |
| 8,347,077 B2* | 1/2013 | Yegani et al. | 713/155 |
| 2009/0201855 A1* | 8/2009 | Weniger et al. | 370/328 |
| 2009/0213797 A1* | 8/2009 | Li | 370/328 |
| 2009/0262685 A1* | 10/2009 | Schuringa et al. | 370/328 |
| 2010/0226313 A1* | 9/2010 | Sugimoto et al. | 370/328 |
| 2010/0272062 A1* | 10/2010 | Velev et al. | 370/331 |
| 2011/0252151 A1 | 10/2011 | Lu et al. | |
| 2012/0023211 A1 | 1/2012 | Haddad | |

OTHER PUBLICATIONS

Wakiawa R. et al.: "Inter Home Agents Protocol (HAHA)"; Internet Citation, Feb. 16, 2004, p. 8, paragraph 3; http://www.mobilenetworks.org/nemo/drafts/draft-wakikawa-mip6-memo-ha__ha-01.txt.

Aura, T., "Cryptographically Generated Addresses (CGA)", *Network Working Group; Request for Comments*: 3972; Category: Standards Track, 22.

Johnson, D., et al., "Mobility Support in IPv6", *Network Working Group; Request for Comments*: 3775; Category: Standards Track, (Jun. 1, 2004), 165.

Notice of Allowance, U.S. Appl. No. 12/969,229, dated Dec. 21, 2012, 15 pages.

* cited by examiner

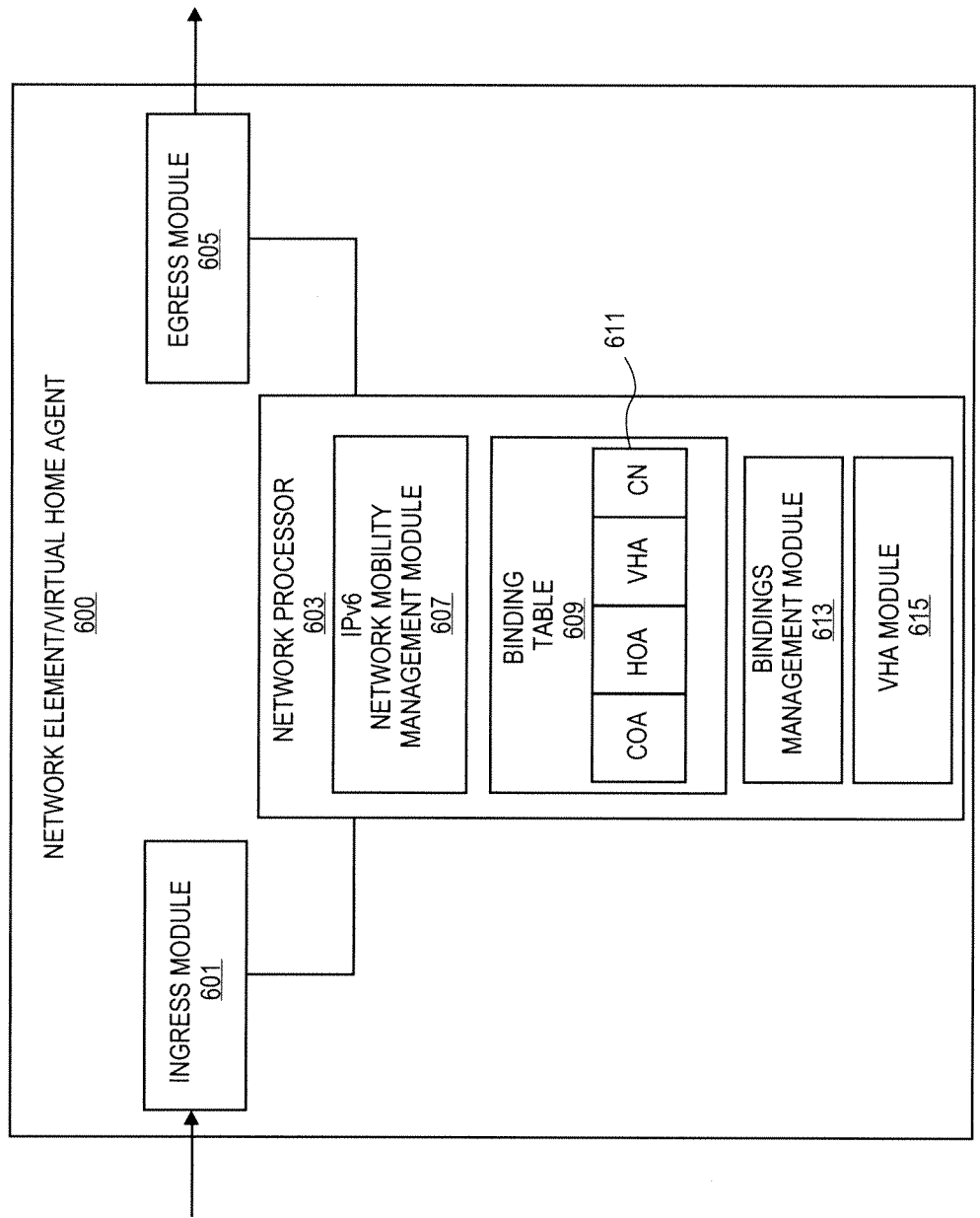

SYSTEM AND METHOD FOR PROVIDING MOBILITY WITH A SPLIT HOME AGENT ARCHITECTURE

The present application claims priority from U.S. Provisional Patent Application No. 61/366,314, filed on Jul. 21, 2010 and also is cross referenced with the co-pending application entitled "SYSTEM AND METHOD FOR MOBILITY WITH A SPLIT HOME AGENT ARCHITECTURE USING MPTCP" filed the same date as the present application and commonly owned. The cross referenced application is incorporated herein by reference.

FIELD OF THE INVENTION

Background

The mobile Internet protocol version 6 (MIPv6) allows a mobile device to maintain a continuous connection with another device that supports mobile Internet protocol version 6. Two separate modes of communication are supported with MIPv6: bi-directional tunneling (BT) mode and route optimization (RO) mode. Mobile IPv6 utilizes a home agent node to manage the forwarding of data traffic to a mobile node when that mobile node is not present in a home network.

When a mobile node moves to a foreign network, the mobile node registers in that network and reports the registration back to the home agent node. The home agent node receives data traffic from the corresponding node and forwards the traffic to the mobile node in the foreign network using IP in IP tunneling in BT mode. In RO mode, the home agent facilitates the communication between the corresponding node and the mobile node such that the corresponding node is notified of the new location and the address of the mobile node in the foreign network allowing the corresponding node to directly communicate with the mobile node in the foreign network without interruption to the transmission control protocol (TCP) connections.

In mobile IPv6, the mobile node has a static home agent which serves as an anchor point to ensure a global and continuous reachability for the mobile node regardless of its current topological location (i.e., in the home network or attached to a foreign network). However, the cases where a failure of the home agent occurs or the home agent is overloaded are not solved by mobile IPv6. BT mode is secure and requires a significant amount of signaling messages to establish and maintain the tunnel between the mobile node and home agent. BT mode is also under the mobile node's control. In contrast, the RO mode requires the direct involvement of both the mobile node and corresponding node and requires that more resources be expended in the overhead mobility signaling to establish and maintain the RO mode in comparison with the BT mode.

SUMMARY

A method implemented by a network element in a wide area network, the network element functioning as a home agent (HA) for a mobile node (MN) communicating with a corresponding node (CN) using Mobile Internet Protocol version 6 (MIPv6), the method comprising the steps of selecting by the HA a virtual home agent (VHA) in the network to provide home agent services to the MN with a better quality of service than the HA based on pre-defined policies sending a host test initiate message to the CN to obtain a home keygen token from the CN, the home keygen token to authenticate the HA receiving a host test message from the CN including the home keygen token sending a flow switch request (FSR) message to the selected VHA, the FSR message including the home keygen token, an address of the CN and a care-of address of the MN, the FSR message to cause the selected VHA to generate and send a care-of test initiate message and binding update message that direct the CN to send data traffic for the MN to the selected VHA instead of the HA, the FSR message to cause the selected VHA to establish a tunnel to the MN; and receiving a flow switch acknowledgement (FSA) message from the VHA indicating that the selected VHA has successfully redirected the data traffic from the CN and is tunneling the data traffic to the care-of address of the MN, whereby the MN receives a better quality of service when communicating with the CN through the VHA than through the HA.

A method implemented by a network element in a wide area network, the network element functioning as a virtual home agent (VHA) for a mobile node (MN) communicating with a corresponding node (CN) using Mobile Internet Protocol Version 6 (MIPv6), the method comprising the steps of receiving at the VHA a flow switch request (FSR) message from a home agent, the FSR message including a care-of address of the MN, an address of the CN and a home keygen token of the CN, the home keygen token to authenticate a home agent (HA), the FSR message to assign home agent services to the VHA; sending a care-of test initiate message to the CN to obtain a care-of keygen token, the care-of keygen token to authenticate the CN; receiving a care-of test message from the CN with the care-of keygen token; sending a binding update message to the CN using the home keygen token and care-of keygen token to authenticate the VHA and to direct the CN to send data packets to the VHA; receiving a binding acknowledgement message from the CN in response to the binding update message, the binding acknowledgement indicating redirection to the VHA by the CN for data packets destined for the MN; establishing a tunnel between the VHA and the MN in response to receiving the binding acknowledgement message; sending a flow switch acknowledgement (FSA) message to the HA in response to the binding acknowledgement message, the FSA message indicating redirection to the VHA by the CN for data packets destined for the MN; and tunneling data packets received from the CN to the care-of address of the MN over the tunnel, whereby the MN receives a better quality of service when communicating with the CN through the VHA than through the HA.

A network element configured to function as a home agent (HA), the network element in communication with a mobile node (MN), a corresponding node (CN) and a plurality of virtual home agents (VHAs) over a wide area network, the network element comprising an egress module configured to receive data packets over the network; an ingress module configured to transport the data packets over the network; a network processor communicatively coupled to the ingress module and egress module, the network processor configured to execute a network mobility management module, a binding management module and a virtual home agent module, the network mobility management module configured to manage a communication session between the MN and the CN, the binding management module communicatively coupled to the network mobility management module, the binding management module configured to maintain a binding table including a set of binding entries, each binding entry including a care-of address for the MN, an address of the HA, an address of the CN and an address of the VHA, the binding management module configured to create and update the set of binding entries, and the virtual home agent management module configured to select a VHA from the plurality of VHAs to provide a home agent service to the MN, the selection based on pre-defined policies, the virtual home agent management module configured to obtain a home keygen token from the CN and to send a flow switch request (FSR) message to the selected VHA including a care-of address for the MN, an address of the CN and the home keygen token, the FSR message to cause the selected VHA to redirect data traffic between the CN and HA to the selected VHA, to cause the selected VHA to establish a tunnel to the MN and to cause the selected VHA to forward traffic from the CN over the tunnel to the MN, the virtual home agent management module configured to receive a flow switch acknowledgement (FSA) message from the selected VHA, whereby the MN receives a better quality of service when communicating with the CN through the VHA than through the HA.

A network element configured to function as a virtual home agent (VHA), the network element in communication with a mobile node (MN), a corresponding node (CN) and a home agent (HA) over a wide area network, the network element comprising an egress module configured to receive data packets over the network; an ingress module configured to transport the data packets over the network; a network processor communicatively coupled to the ingress module and egress module, the network processor configured to execute a network mobility management module, a binding management module and a virtual home agent module, the network mobility management module configured to manage a communication session between the MN and the CN, the binding management module communicatively coupled to the network mobility management module, the binding management module configured to maintain a binding table including a set of binding entries, each binding entry including a care-of address for the MN, an address of the HA, an address of the CN and an address of the VHA, the binding management module configured to create and update the set of binding entries, and the virtual home agent module configured to provide a home agent service to the MN, the virtual home agent module configured to obtain a home keygen token from a flow switch request (FSR) message received from the HA, the FSR message including the care-of address for a MN, the address for the CN and the home keygen token, the virtual home agent module configured to send a care-of test initiate message to the CN and receive a care-of test message with a care-of keygen token, to send a binding update message to the CN using the home keygen token and care-of keygen token to authenticate the VHA, to establish a tunnel to the MN, to send a flow switch acknowledgement (FSA) message to the HA and to forward data traffic from the CN to the MN over the tunnel, whereby the MN receives a better quality of service when communicating with the CN through the VHA than through the HA.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 6 is a diagram of one embodiment of a virtual home agent.

DETAILED DESCRIPTION

Figure 1:
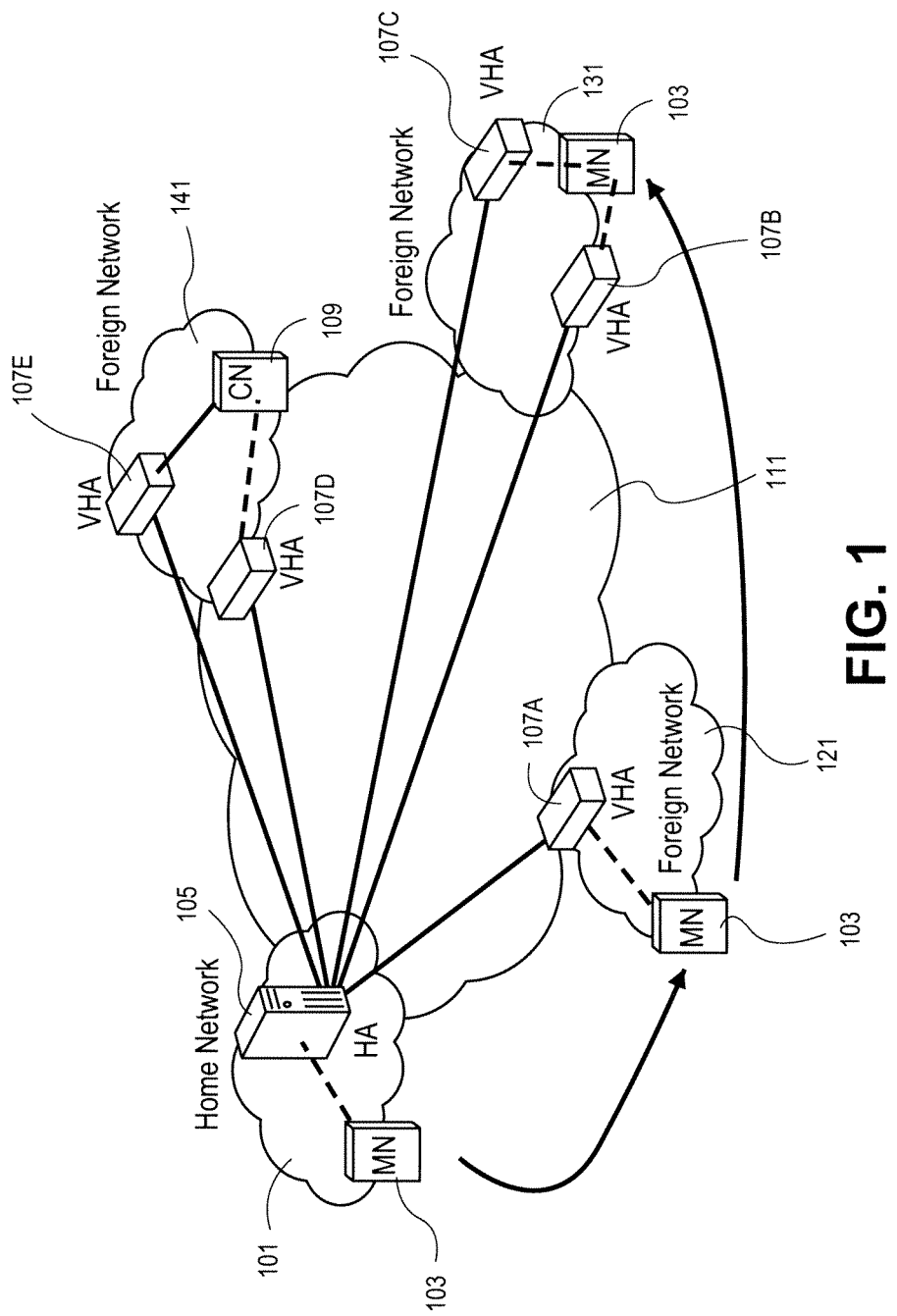
FIG. 1 is a diagram of one embodiment a network implementing the split home agent architecture.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 4-6. However, it should be understood that the operations of the flow diagrams can be performed by embodiments of the invention other than those discussed with reference to FIGS. 1 and 4-6, and the embodiments discussed with reference to FIGS. 1 and 4-6 can perform operations different than those discussed with reference to the flow diagrams of FIGS. 2 and 3.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art include bi-directional tunneling (BT) mode not being optimal when the mobile node is far away from its home network. For example, if a mobile node is in the United States communicating with a corresponding node located in the United States while its home network is in Japan, then all traffic between the mobile node and corresponding node has to go to the home agent in Japan before coming back to the mobile node. The telecommunications landscape is going through a tremendous growth in the real time applications, services and web-enabled high definition television and these type of applications are expected not only to grow but to be also the main driver for telecommunication service operators revenues. Hence, ensuring a high Quality of Service to the customer is important in an increasingly competitive environment. Furthermore, these particular types of applications may lead to a "bottleneck" at the home agent level in which case, all clients will suffer a drop in the service quality.

The embodiments of the invention overcome these disadvantages of the prior art. Instead of deploying a cluster of home agents in a home network, a split control architecture is utilized whereby a central home agent connects to a set of new lightweight virtual home agents (VHAs), which don't deal directly with the mobile node, but are able to provide specific services as requested by the home agent and based on feedback from the mobile node. In addition, virtual home agents can be located anywhere and don't need to exchange direct signaling with the mobile node (i.e., mobility related signaling or other signaling). Instead, virtual home agents aim to offer particular home agent features for the mobile node without the knowledge of the mobile node. The home agent has a secure connection with each virtual home agent and is fully aware of each virtual home agent location.

The split home agent architecture and method is suitable for multi-homed mobile nodes. This means that a mobile node is expected to have at least two different interfaces (e.g., an interface with the line terminal equipment (LTE) and an interface with the (WLAN) in which case, both interfaces are connected to the same operator network (e.g., AT&T, Verizon, T-Mobile and similar operators). This split home agent based architecture provides a better mobility performance than the performance provided by the BT mode.

Consequently, the split home architecture can be described as having one centralized policy control node, which receives input from the mobile node, among others, and makes a decision accordingly. The centralized control node is executed by a home agent node that is connected to a large set of lightweight home agents which serve to create a sort of "location-based" virtual home agent but with no direct relationship with the mobile node. The mobile node updates its home agent with new a care-of address (CoA) and lets the home agent determine the right virtual home agent (in cases where one can be used).

The main benefits of having a virtual home agent are to optimize the data traffic routing, offer a better quality of service (QoS) and offload the services of the home agent whenever needed. Such optimization includes implementing the equivalent of a route optimization mode without requiring the two real endpoints (i.e., mobility node and corresponding node) to deal with each other in terms of exchanging mobility signaling protocols. The virtual home agents can be located anywhere and do not pose a scalability issue. In addition, the home agent can also move sessions from one virtual home agent (VHA) to another depending on the mobile node location so that the mobile node can always be assigned to the closest virtual home agent.

While the MIPv6 RO mode enables a data packet exchange on the direct path between the mobile node and the corresponding node. The split home agent architecture fits between the BT mode and the RO mode and is more beneficial and quicker to implement because it enables the operators to keep full control of the traffic flows while optimizing data packets routing.

FIG. 1 is a diagram of one embodiment of a network implementing the split home agent architecture. The network includes a mobile node 103, a home agent 105 located in the home network 101, a set of foreign networks 121, 131, 141 and a set of virtual home agents 107A-107E. The home network 101 and foreign networks 121, 131 and 141 can be connected by a core network 111. Each of these networks can be a local area network (LAN), a wide area network (WAN), such as the Internet, or a similar network. The mobile node 103 can be moved between any of the networks 101, 121, 131 and 141 and maintain a connection with a corresponding node over the network 111.

The mobile node 103, home agent node 105 and virtual home agents 107A-107E can be any type of computing devices or networking elements including laptop computers, routers, switchers, desktop computers, servers, handheld devices, console devices and similar computing and networking devices. The networks 101, 111, 121, 131 and 141 can include any combination of wired and wireless connections and any number of intermediate computers or networking devices.

In one embodiment, the mobile node 103 and home agent 105 implement the mobile Internet protocol version 6 (MIPv6) or similar communication protocol enabling the mobile node 103 to maintain connections (e.g., TCP connections) with corresponding nodes when moving between networks and when changing network connections. The virtual home agents 107A-107E are controlled by the home agent 105, which selects and directs the virtual home agents 107A-107E to perform home agent functionality thereby offloading these functions to the virtual home agents 107A-107E from the home agent 105 or sharing these functions with the virtual home agents 107A-107E in coordination with the home agent 105.

The use of these virtual home agents 107A-107E to provide any subset of the functionality of the home agent 105 is to improve the quality of service offered to the mobile node 103.

By utilizing a virtual home agent 107A-107E in place of the home agent 105, the virtual home agent 107A-107E can have a greater proximity to the mobile node 103. As a result, a higher quality of service can be offered to the mobile node 103 in cases where the home agent 105 is not as close to the mobile node and corresponding node 109 as a virtual home agent 107A-107E. Improved quality of service can include increased bandwidth, lower latency and similar improved communication metrics between the mobile node 103 and the corresponding node 109 using the virtual home agent 107A-107E in comparison to using the home agent 105.

The mobile node 103 can be connected to a home agent 105 regardless of the current network that a mobile node 103 is connected to in order to keep the home agent 105 up to date on the current location of the mobile nodes 103 so that the home agent 105 can determine which virtual home agent 107A-107E should be utilized to provide home agent services to the mobile node 103. At any given time, the mobile node 103 can be connected to multiple virtual home agents 107A-107E in addition to being connected to the home agent 105. Each network can include a NAT66 to perform network address translation such that data packets destined for the mobile node 103 can be properly translated to its local address in the foreign network 121 and 141. Each virtual home agent 107A-107E can also have a secure connection to the home agent 105 to receive communication and direction from the home agent 105 as well as to keep the home agent 105 informed of its status and location.

Figure 2:
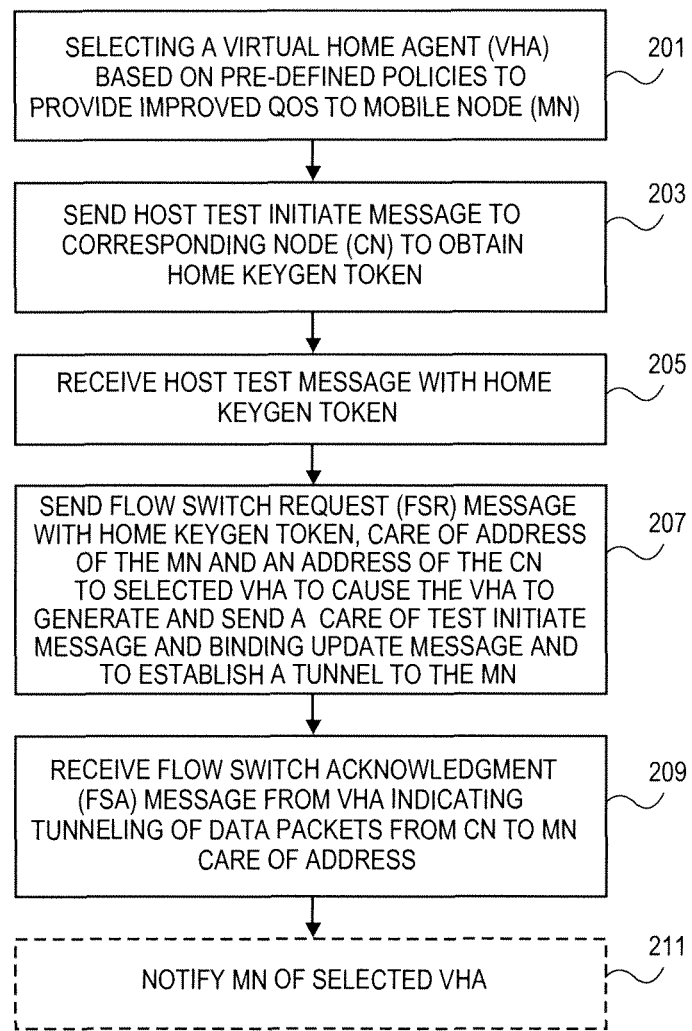
FIG. 2 is a flowchart of one embodiment of a process performed by the home agent for configuring a virtual home agent.

FIG. 2 is a flowchart of one embodiment of a process performed by the home agent for configuring a virtual home agent. In one embodiment, the home agent can begin the process of assigning responsibility for providing home agent functionality (such as forwarding of data traffic from a corresponding node to the mobile node) to a virtual home agent in response to a notification (e.g., a binding update message) from the mobile node including its location in a foreign network.

A virtual home agent can be utilized when the virtual home agent is more proximate or able to provide better quality of service to the mobile node than the home agent. The home agent node can compare location and other information of the mobile node with a local database of virtual home agent information to determine the best set of virtual home agents to service the mobile node. The virtual home agent can be selected based on pre-defined policies that define the improved quality of service that can be provided to a mobile node by available virtual home agents (Block 201). The pre-defined policies can include a comparison of the care-of address of the mobile node with the virtual home agent addresses, the use of topological information, quality of service requirements, bandwidth and latency metrics and similar standards by which a virtual home agent can be determined to be able to provide an improved quality of service in comparison with the home agent. A single virtual home agent can be selected or any number of virtual home agents can be selected to provide any combination of home agent services. The virtual home agents can process flow switch request messages, store parameters provided in the flow switch request message (e.g., in a dedicated cache memory) and return a flow switch acknowledgement message. The virtual home agent can execute both BT and RO modes of MIPv6, including receiving binding update messages, sending binding acknowledgement messages and processing RO mode mobility signaling messages.

After a virtual home agent or set of virtual home agents has been selected, the home agent sends a host test initiate (HoTI) message to the corresponding node to obtain a home keygen token (Block 203). The host test initiate message is a message defined in the mobile Internet protocol v 6. The host test initiate message and the corresponding host test message, provided as a response, are utilized to test the availability of a particular node, in this case the corresponding node. A response message is received from the corresponding node in the form of a host test message which includes the home keygen token (Block 205). The home keygen token is a key identifier or similar data that can be utilize by the corresponding node and home agent to authenticate the corresponding node. The home agent can provide this home keygen token to the virtual home agent to enable the virtual home agent to set up a connection with the corresponding node and re-direct the flow of the corresponding node's traffic to the virtual home agent in place of the home agent, thereby allowing the virtual home agent to provide services to the mobile node that have an improved quality of service in comparison to the home agent.

The home keygen token is provided to the virtual home agent through a flow switch request message. The presence of the home keygen token in the flow switch request message (together with the corresponding node's address) indicates to the virtual home agent that it has to exchange care-of test initiate (CoTI) and care-of test (CoT) messages with the corresponding node in order to obtain the care-of keygen token, which is then used with the home keygen token received in the flow switch request message. The flow switch message can also include the mobile node's care-of address and the corresponding node's address. The flow switch request message triggers the virtual home agent to generate the care-of test initiate message and subsequently a binding update message to be sent to the corresponding node to effect the redirection of traffic from the home agent to the virtual home agent (Block 207).

After the virtual home agent has completed the redirection using the care-of test initiate message and subsequently the binding update message, the virtual home agent will send a flow switch acknowledgement message to the home agent. The home agent receives this flow switch acknowledgement message from the virtual home agent which indicates that the virtual home agent has successfully redirected traffic from the corresponding node to the virtual home agent and set up a tunnel to the mobile node through which traffic from the corresponding node is forwarded (Block 209).

In one embodiment, the home agent can then also notify the mobile node of each virtual home agent that has been selected to provide home agent services to the mobile node (Block 211). The notification can be in the form of providing an address of the virtual home agent. However, the mobile node still provides all updates of its status and location to the home agent so the home agent can manage the appropriate use of virtual home agent. In other embodiments, the use of virtual home agent can be transparent to the mobile node.

Figure 3:
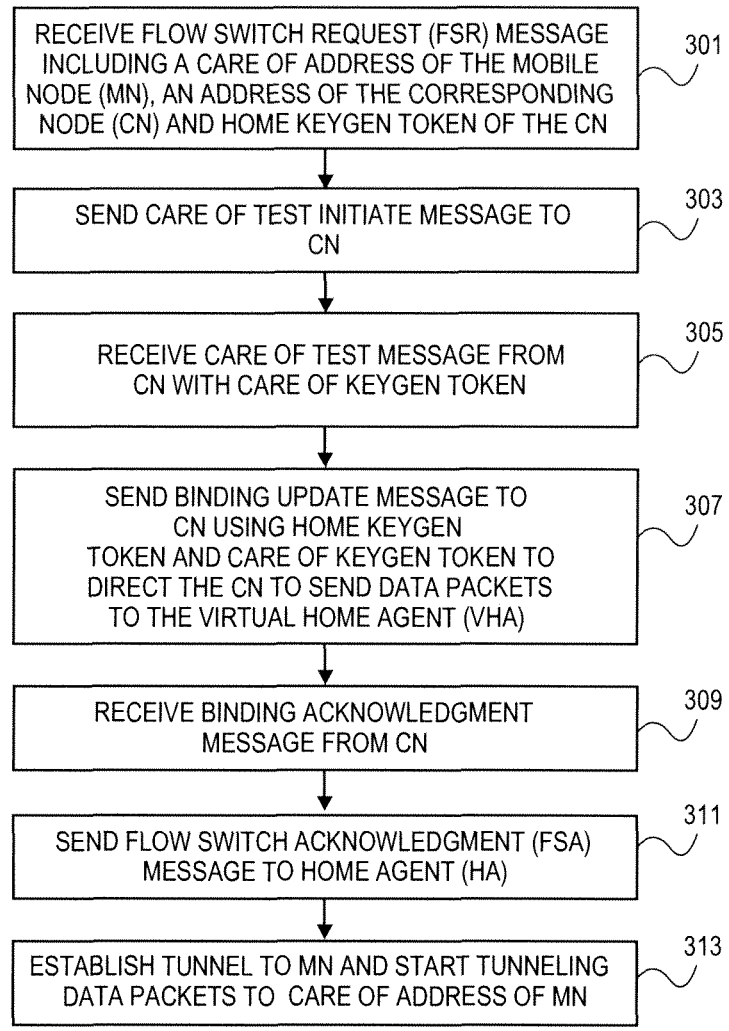
FIG. 3 is a flowchart of one embodiment of the process performed by the virtual home agent for configuring a virtual home agent.

FIG. 3 is a flowchart of one embodiment of a process performed by a virtual home agent. In one embodiment, the process can be initiated by the receipt at the virtual home agent of a flow switch request message including the mobile node's address, a corresponding node's address and the home keygen token of the corresponding node (Block 301). The flow switch request message from the home agent indicates that the virtual home agent has been selected to perform the services or at least a subset of the services of the home agent for the designated mobile node and corresponding node connection. The virtual home agent can update a local binding table to record in a binding entry the correlation of the mobile node address, corresponding node address, home agent address, home keygen token and care-of keygen token in response to receiving the flow switch request. The virtual home agent then starts the process of redirecting the traffic of the corresponding node by sending a care-of test initiate message to the corresponding node (Block 303). The care-of test initiate message, defined by the mobile Internet Protocol version 6 enables the testing of reachability of the care-of address.

In response to the receipt of the care-of test initiate message, the corresponding node sends a care-of test message with the care-of keygen token. The virtual home agent receives this care-of test message from the corresponding node with the care-of keygen token for the corresponding node (Block 305). The virtual home agent then sends a binding update message to the corresponding node using the home keygen token received from the home agent and the care-of keygen token received from the corresponding node to effect the re-direction of the data traffic between the corresponding node and the mobile node from the home agent to the virtual home agent (Block 307). The combined presence of the home keygen token and the care-of keygen token serves to enable verification or authentication at the corresponding node. The corresponding node then replies with a binding acknowledgement message, which is received at the virtual home agent (Block 309). The virtual home agent then confirms its binding updates in its own bindings table or at this time creates the appropriate binding entry in its binding table.

The virtual home agent then sends a flow switch acknowledgement message to the home agent and establishes a tunnel to the mobile node care-of address (Block 313). The tunnel of the mobile node can be an IP in IP tunnel or similar tunnel. The mobile node can be unaware that a virtual home agent rather than the home agent is forwarding data traffic or providing other home agent services.

Figure 4:
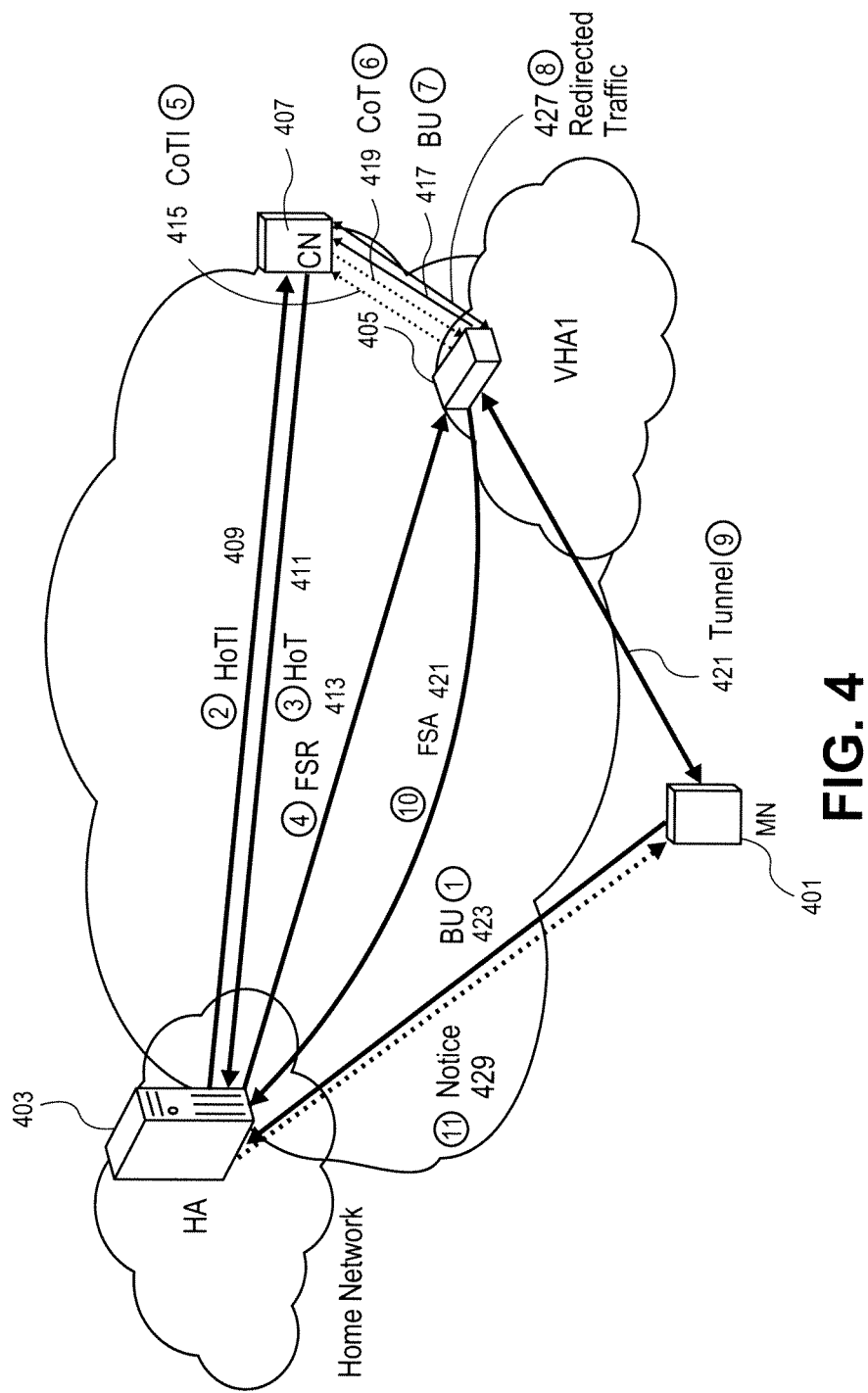
FIG. 4 is a diagram of one embodiment of split home agent architecture messaging.

FIG. 4 is a diagram of one embodiment of the split home agent architecture showing the exchange of messages described above in regard to FIGS. 2 and 3. In the diagram, the home agent (HA) 403 receives a binding update (BU) message 423 from the mobile node 401, which is proximate to the virtual home agent 405. The home agent 403 then selects the virtual home agent 405 to service the mobile node (MN) 401 with regard to its connection to corresponding node 407. This process is started by sending the host test initiate (HoTI) message 409 which the corresponding node replies to with the host test (HoT) message 411. These messages verify the reachability of the corresponding node and provide the home agent with the home keygen token of the corresponding node.

The home agent then generates a flow switch request (FSR) message 413 that includes the home keygen token and sends this message 413 to the virtual home agent 405. Virtual home agent 405 then generates a care-of test initiate (CoTI) message 415 to the corresponding node 407. The corresponding node 407 replies with the care-of test (CoT) message 410 including the care-of keygen token. The virtual home agent then generates a binding update message 417 to redirect traffic from the corresponding node 407 to the virtual home agent 405. Virtual home agent 405 then generates a tunnel 421 to the mobile mode 401. In one embodiment, the virtual home agent 405 employs the BT mode in communicating with the mobile node 401. The virtual home agent 405 also sends a flow switch acknowledgement (FSA) message 421 back to the home agent confirming that the flow switch has been affected.

Figure 5:
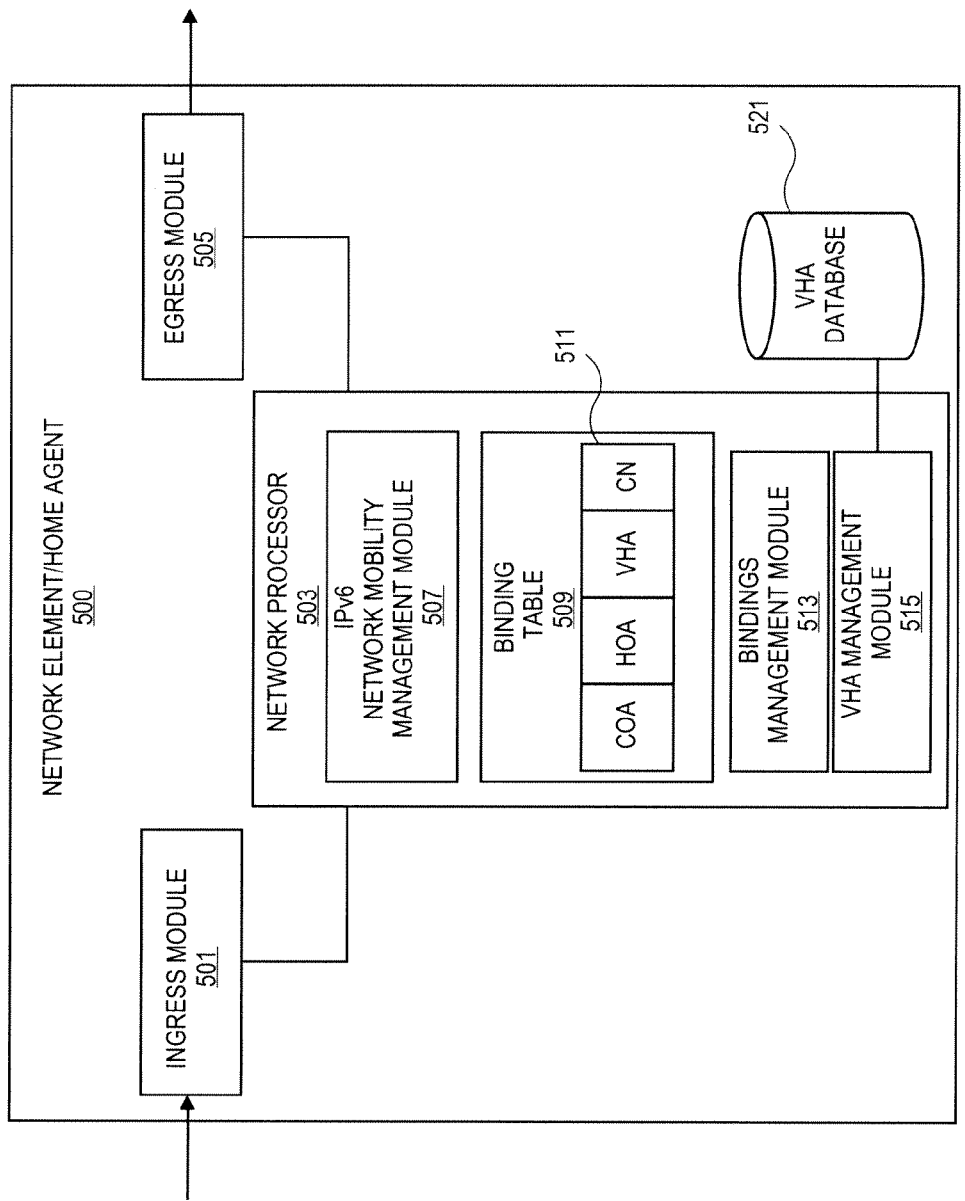
FIG. 5 is a diagram of one embodiment of a home agent.

FIG. 5 is a diagram of one embodiment of a network element serving as the home agent node. The network element 500 can include an ingress module 501, an egress module 505 and a network processor 503. The ingress module 501 can handle the processing of data packets being received by the network element at the physical link and data link level.

The egress module 505 handles the processing and data packets being transmitted by the network element at the physical link and data link level. The network processor 503 handles the routing, forwarding and higher level processing of the data traffic. The network processor 503 can execute or include an IPv6 network mobility management module 507, bindings table 509, bindings management module 513 and a virtual home agent management module 515.

The network mobility management module 507 receives data traffic from the mobile node and forwards that data traffic to a corresponding node when a virtual home agent has not been assigned. The mobility management module implements the basic mobile IPv6 functionality including supporting BT and RO modes, tunneling and address translation. The network mobility management module 503 also receives data traffic from the corresponding node and forwards it to the mobile node. Any combination of these functions can be delegated to a virtual home agent.

The bindings management module 513 receives binding update messages from the mobile node when the mobile node connects to foreign networks. Each of the binding update messages includes an IPv6 care-of address assigned by the foreign network to which the mobile node is currently connecting. The binding management module 513 is further configured to send a binding request message, responsive to each of the binding update messages that is received, to the home NAT node to bind the mobile node's home address with a prefix of a foreign NAT node in that foreign network at the home NAT node. The binding management module 513 also receives binding update messages or requests from the virtual home agent management module 515. The binding management module 513 updates and maintains binding entries 511 in the binding table 509. These binding entries 511 correlate the care-of address (COA), home agent address (HOA), virtual home agent address (VHA), corresponding node address (CN) and similar data to be used for forwarding data traffic between a mobile node and corresponding node as well as tracking the delegation of home agent services to a virtual home agent.

A virtual home agent (VHA) management module 515 selects a virtual home agent and performs the transfer of home agent services to the virtual home agent as described above in regard to FIG. 2. A virtual home agent database 521 or similar storage system or data structure tracks the properties, topology and similar virtual home agent information needed to select and transfer services to the available virtual home agents. The virtual home agent database can also be utilized to track the assignment of home agent services to each virtual home agent.

FIG. 6 is a diagram of one embodiment of a virtual home agent. The network element 600 can include an ingress module 601, an egress module 605 and a network processor 603. The ingress module 601 can handle the processing of data packets being received by the network element at the physical link and data link level. The egress module 605 handles the processing and data packets being transmitted by the network element at the physical link and data link level. The network processor 603 handles the routing, forwarding and higher level processing of the data traffic. The network processor 603 can execute or include an IPv6 network mobility management module 607, bindings table 609, bindings management module 613 and a virtual home agent module 615.

The network mobility management module 607 receives data traffic from the mobile node and forwards that data traffic to a corresponding node when a virtual home agent has not been assigned. The mobility management module implements the basic mobile IPv6 functionality including supporting BT and RO modes tunneling and address translation. The network mobility management module 603 also receives data traffic from the corresponding node and forwards it to the mobile node.

The binding management module 613 receives binding update messages or requests from the virtual home agent module 615. The binding management module updates and maintains binding entries 611 in the binding table 609. These binding entries correlate the care-of address (COA), home agent address (HOA), virtual home agent address (VHA), corresponding node address (CN) and similar data to be used for forwarding data traffic between a mobile node and corresponding node as well as tracking the home agent services to be performed for each mobile node or home agent node.

A virtual home agent (VHA) module 615 receives requests from home agents to transfer home agent services to the virtual home agent as described above in regard to FIG. 3. The virtual home agent module 615 processes flow switch requests messages from the home agent and redirects data traffic from the corresponding node to the virtual home agent using a binding update message and/or CoTI message. The virtual home agent can also execute other services delegated by the home agent.

Thus, a method, system and apparatus for enabling a split home agent architecture has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element in a wide area network, the network element functioning as a home agent (HA) for a mobile node (MN) communicating with a corresponding node (CN) using Mobile Internet Protocol version 6 (MIPv6), the method comprising the steps of:
    selecting by the HA a virtual home agent (VHA) in the network to provide home agent services to the MN with a better quality of service than the HA based on predefined policies;
    sending a host test initiate message to the CN to obtain a home keygen token from the CN, the home keygen token to authenticate the HA;
    receiving a host test message from the CN including the home keygen token;
    sending a flow switch request (FSR) message to the selected VHA, the FSR message including the home keygen token, an address of the CN and a care-of address of the MN, the FSR message to cause the selected VHA to generate and send a care-of test initiate message and binding update message that direct the CN to send data traffic for the MN to the selected VHA instead of the HA, the FSR message to cause the selected VHA to establish a tunnel to the MN; and
    receiving a flow switch acknowledgement (FSA) message from the VHA indicating that the selected VHA has successfully redirected the data traffic from the CN and is tunneling the data traffic to the care-of address of the MN,
    whereby the MN receives a better quality of service when communicating with the CN through the VHA than through the HA.

2. The method of claim 1, further comprising the steps of:
    notifying the MN of an address of the selected VHA to direct the MN to tunnel data packets to the CN through the selected VHA.

3. The method of claim 1, wherein the predefined policies are one or more of a comparison of the care-of address of the MN with each address of a plurality of virtual home agents including said virtual home agent, topological information, quality of service requirements, bandwidth metrics and latency metrics.

4. A method implemented by a network element in a wide area network, the network element functioning as a virtual home agent (VHA) for a mobile node (MN) communicating with a corresponding node (CN) using Mobile Internet Protocol Version 6 (MIPv6), the method comprising the steps of:
    receiving at the VHA a flow switch request (FSR) message from a home agent, the FSR message including a care-of address of the MN, an address of the CN and a home keygen token of the CN, the home keygen token to authenticate a home agent (HA), the FSR message to assign home agent services to the VHA;
    sending a care-of test initiate message to the CN to obtain a care-of keygen token, the care-of keygen token to authenticate the CN;
    receiving a care-of test message from the CN with the care-of keygen token;
    sending a binding update message to the CN using the home keygen token and care-of keygen token to authenticate the VHA and to direct the CN to send data packets to the VHA;
    receiving a binding acknowledgement message from the CN in response to the binding update message, the binding acknowledgement indicating redirection to the VHA by the CN for data packets destined for the MN;
    establishing a tunnel between the VHA and the MN in response to receiving the binding acknowledgement message;
    sending a flow switch acknowledgement (FSA) message to the HA in response to the binding acknowledgement message, the FSA message indicating redirection to the VHA by the CN for data packets destined for the MN; and
    tunneling data packets received from the CN to the care-of address of the MN over the tunnel,
    whereby the MN receives a better quality of service when communicating with the CN through the VHA than through the HA.

5. The method of claim 4, wherein the tunneling is Internet Protocol in Internet Protocol tunneling.

6. The method of claim 4, further comprising the steps of: receiving data packets from the MN over the tunnel; and forwarding the data packets to the CN.

7. A network element configured to function as a home agent (HA), the network element in communication with a mobile node (MN), a corresponding node (CN) and a plurality of virtual home agents (VHAs) over a wide area network, the network element comprising:
    an egress module configured to receive data packets over the network;
    an ingress module configured to transport the data packets over the network;
    a network processor communicatively coupled to the ingress module and egress module, the network processor configured to execute a network mobility management module, a binding management module and a virtual home agent module, the network mobility management module configured to manage a communication session between the MN and the CN, the binding management module communicatively coupled to the network mobility management module, the binding management module configured to maintain a binding table including a set of binding entries, each binding entry including a care-of address for the MN, an address of the HA, an address of the CN and an address of the VHA, the binding management module configured to create and update the set of binding entries, and the virtual home agent management module configured to select a VHA from the plurality of VHAs to provide a home agent service to the MN, the selection based on pre-defined policies, the virtual home agent management module configured to obtain a home keygen token from the CN and to send a flow switch request (FSR) message to the selected VHA including a care-of address for the MN, an address of the CN and the home keygen token, the FSR message to cause the selected VHA to redirect data traffic between the CN and HA to the selected VHA, to cause the selected VHA to establish a tunnel to the MN and to cause the selected VHA to forward traffic from the CN over the tunnel to the MN, the virtual home agent management module configured to receive a flow switch acknowledgement (FSA) message from the selected VHA, whereby the MN receives a better quality of service when communicating with the CN through the VHA than through the HA.

8. The network element of claim 7, further comprising:
a virtual home agent database configured to store information about one or more of location and topology of the plurality of VHAs in the network.

9. The network of claim 7, wherein the pre-defined policies include one or more of a comparison of the care-of address of MN with each address of the plurality of VHAs, topological information, quality of service requirements, bandwidth and latency metrics.

10. The network element of claim 7, wherein the virtual home agent management module is configured to notify the mobile node of the selected VHA.

11. A network element configured to function as a virtual home agent (VHA), the network element in communication with a mobile node (MN), a corresponding node (CN) and a home agent (HA) over a wide area network, the network element comprising:

an egress module configured to receive data packets over the network;

an ingress module configured to transport the data packets over the network;

a network processor communicatively coupled to the ingress module and egress module, the network processor configured to execute a network mobility management module, a binding management module and a virtual home agent module, the network mobility management module configured to manage a communication session between the MN and the CN, the binding management module communicatively coupled to the network mobility management module, the binding management module configured to maintain a binding table including a set of binding entries, each binding entry including a care-of address for the MN, an address of the HA, an address of the CN and an address of the VHA, the binding management module configured to create and update the set of binding entries, and the virtual home agent module configured to provide a home agent service to the MN, the virtual home agent module configured to obtain a home keygen token from a flow switch request (FSR) message received from the HA, the FSR message including the care-of address for a MN, the address for the CN and the home keygen token, the virtual home agent module configured to send a care-of test initiate message to the CN and receive a care-of test message with a care-of keygen token, to send a binding update message to the CN using the home keygen token and care-of keygen token to authenticate the VHA, to establish a tunnel to the MN, to send a flow switch acknowledgement (FSA) message to the HA and to forward data traffic from the CN to the MN over the tunnel, whereby the MN receives a better quality of service when communicating with the CN through the VHA than through the HA.

12. The network element of claim 10, wherein the virtual home agent module and network mobility management module are configured to tunnel data from the CN to the MN using Internet protocol in Internet protocol tunneling.

13. The network element of claim 10, wherein the virtual home agent module and network mobility management module are configured to receive data packets from the MN and forward the data packets to the CN.

* * * * *